3,580,929
PROCESS FOR RECOVERING FERMENTATION ESTROGENIC SUBSTANCE
Phil H. Hidy and Vernon V. Young, Terre Haute, Ind., assignors to Commercial Solvents Corporation
No Drawing. Continuation-in-part of application Ser. No. 670,393, Sept. 25, 1967. This application Apr. 16, 1968, Ser. No. 721,604
Int. Cl. C07d 9/00
U.S. Cl. 260—343.2          19 Claims

ABSTRACT OF THE DISCLOSURE

A process for the recovery of a fermentation product from a porous substrate such as recovery of the anabolic and estrogenic substance known at F.E.S., identified in U.S. Pat .No. 3,196,019, produced by cultivation of the microorganism *Gibberella zeae* (Gordon) on a porous substrate, especially from a synthetic fermentation medium which includes exfoliated vermiculite as a support for the microorganism and a nutrient production medium including sugar as the carbohydrate source and added minerals desired for proper growth of the microorganism. In this recovery process the porous substrate or fermentation cake is crushed and slurried with an aqueous alkaline solution to dissolve the normally water-insoluble F.E.S. The solution is then filtered and acidified to precipitate the F.E.S. which is recovered. The solution is heated prior to or during acidification to insure the production of easily filterable F.E.S. crystals.

---

This application is a continuation-in-part of copending application Ser. No. 670,393, filed Sept. 25, 1967.

This invention relates to improved methods for the recovery of a fermentation product such as the anabolic and estrogenic substance described in United States Letters Patent 3,196,019, i.e., a compound have the structural formula:

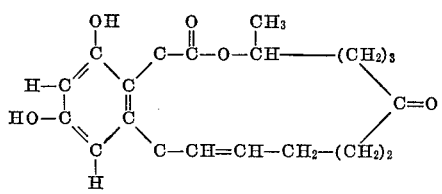

The compound described above is, as described in U.S. Pat. 3,196,019, produced by cultivating the microorganism *Gibberella zeae* (Gordon) on a suitable nutrient medium and will be hereinafter described as F.E.S., standing for fermentation estrogenic substance. In producing F.E.S. the spores or the vegetative mycelia of the microorganism are incubated in a suitable inoculation medium. Heretofore, the microorganism-containing inoculation medium has then been introduced into a fermentation medium containing one of the common grains as the carbohydrate source, i.e. finely divided corn. After a fermentation period of 6 to 20 days, the F.E.S. has been recovered from the fermentation medium, e.g. as described in U.S. Pat. No. 3,196,019, by extracting the fermentation medium with 95% ethanol, concentrating the ethanol extract, dissolving the concentrated extract in chloroform, extracting the chloroform solution with 5% sodium carbonate solution having an adjusted pH of about 9–12, and then acidifying the sodium carbonate extract with hydrochloric acid to a pH of about 6 to 6.5 to precipitate the solid impure F.E.S.

An improved method for production of F.E.S. utilizing a synthetic substrate of fermentation medium has also now been provided whereby improved conversions of carbohydrate to F.E.S. are realized and improved methods of recovery of F.E.S. from the fermentation media can be used whereby improved overall yields of F.E.S. can be obtained. This synthetic fermentation medium is described in copending application Ser. No. 670,455 filed Sept. 25, 1967. In general the synthetic fermentation medium includes an inert support material and an aqueous nutrient production medium containing a sugar as the assimilable carbohydrate source and minerals desired for optimum growth of the organism. In addition to carbohydrate, nutrient media utilized also require the presence of an assimilable nitrogen source in either organic or inorganic form such as urea, ammonium salts such as ammonium chloride, ammonium sulfate, ammonium tartrate, etc. Also, a source of potassium and phosphorus such as dipotassium phosphate is required for suitable yields as are trace minerals containing such minerals as iron, sodium, magnesium, manganese, etc., in compounds such as magnesium sulfate, ferrous sulfate, etc.

The preferred support material is exfoliated vermiculite which has such desirable properties as high porosity, high void volume to surface area ratio, low density, relative chemical inertness and availability in a wide range of particle sizes. Exfoliated vermiculite having bulk densities of above 4 pounds per cubic foot, or about 5 to 10, or even 12 pounds per cubic foot are suitable, although preferably the bulk density is less than about 8 or 9 pounds per cubic foot and is particularly in the range of about 5 to 7 pounds per cubic foot. Exfoliated vermiculite is commercially available in several grades of sieve size and bulk density including those marketed by W. R. Grace and Company under the tradenames Zonolite, Verxite and Terralite which are respectively, insulation grade, pure chemical grade and agricultural grade. Several grades of these commercially available exfoliated vermiculites, identified in Table I by their average density and sieve size, may be individually used or used in combined form.

The sugar contained in the aqueous production medium is preferably a mono- or a di-saccharide and is usually glucose, sucrose or maltose. The sugar is present in the aqueous nutrient medium in amounts sufficient for reduction by the microorganism to produce F.E.S. and up to the amount at which it begins to crystallize out of the medium. Generally, the carbohydrate, e.g. glucose is present in amounts from about 20% to about 50% by weight of the production medium, preferably between about 30 and 45% by weight. Trace minerals which should be present in the aqueous production medium are those which provide the ions desired for proper growth of the microorganism and each should be present in an amount sufficient to insure proper growth of the microorganism. The amounts of the various minerals in the medium can vary considerably although generally, amounts of the minerals sufficient to provide the desired ions in the medium in amounts of about 0.001 to 1% by weight are sufficient. Yeast is advantageously included in the aqueous production medium in an amount sufficient to provide the necessary growth factors, e.g. B vitamens, for the microorganism. Preferably, distilled water, or deionized water, is used in the production medium although tap water can be used if reduced yields of F.E.S. are acceptable.

F.E.S. is readily produced by cultivating the organism *Gibberella zeae* (Gordon) on this synthetic fermentation medium of the copending application referred to above. A live culture of the organism is on deposit with the United States Department of Agriculture, Agricultural Research Service, Northern Utilization Research and Development Division, Peoria, Ill., under the number NRRL 3311. In carrying out the fermentation, an inoculum of the organism is prepared and mixed with the production medium for even dirtribution over the inert support to provide the fermentation medium. If desired, the inoculum, medium and support can be mixed and then spread over the fermentation tray. Generally, about 240 milliliters of production medium is sufficient for from about 40 to 240 grams of the support material, and preferably is used with about 80 grams. During fermentation, the temperature of the fermentation medium is preferably controlled to provide for optimum production of F.E.S. by placing the fermentation container in a temperature controlled bath, such as a water bath, maintained generally from about 12 to 25° C., preferably about 14 to 19° C., particularly about 15 to 17° centigrade. The pH of the fermentation medium should be between 4½ and 6½, preferably between 5 anl 6. Generally, under these conditions, a suitable yield of F.E.S. can be obtained in a period ranging from about 1 to 6 weeks, usually 4 to 5 weeks, depending upon the vitality of the microorganism.

This invention comprises an improved process for the recovery of F.E.S. from a fermentation cake, e.g., the synthetic substrate or fermentation medium of applicants' copending application Ser. No. 670,455 after growth of the microorganism thereon has stopped. In general, this process comprises slurrying a fermentation cake such as the spent vermicultie medium with an alkaline solution in an amount sufficient to render the F.E.S. contained therein soluble in the solution, filtering the solution to remove the spent cake, acidifying the remaining solution and recovering the precipitated F.E.S.

The substrate or fermentation cake is normally broken into chunks and washed, e.g. with water, to remove water soluble materials prior to treatment with the alkaline solution. This removes water-soluble materials which may interfere with the subsequent filtration and crystallization and does not appreciably reduce the F.E.S. content since F.E.S. is very insoluble in water. The washed fermentation cake is then combined with an alkaline solution to form a slurry. The amount of alkaline solution added need only be that sufficient to provide a slurry and should not be so much as to cause loss of F.E.S. to the mother liquor remaining after recovery. The mother liquor will always be saturated with F.E.S. although the total amount of F.E.S. contained therein will be very small due to its low solubility in water. In general, about 1 to 3 or 5 liters, or more, of the alkaline solution per 500 grams of fermentation cake can be used. Preferred amounts are about 1 to 3 liters of the alkaline solution per 500 grams of cake.

The alkaline solution should contain an amount of alkaline material sufficient to provide the fermentation cake slurry with a pH effective to dissolve the F.E.S. but insufficient to decompose the F.E.S. which can become unstable in strong caustic solutions, particularly at high temperatures. A pH above about 9, preferably about 10 to 12, is generally suitable. Suitable alkaline solutions include those of an alkaline metal, alkaline earth metal, or ammonium hydroxide or carbonate although sodium, potassium and ammonium hydroxides are preferred. Extraction of F.E.S. from the vermiculite fermentation cake can be advantageously accomplished at room temperatures although higfiher temperatures can also be used. Times sufficient to dissolve the F.E.S., generally from about 30 minutes to several, e.g. 3 or 4, or more hours, preferably ½ to 3 hours, are used.

Separation of the spent cake from the alkaline solution is accomplished by any conventional means such as centrifugation, decantation, etc., as well as filtration. The solution can be polished, if desired. That is, any solids that pass the filtration can be removed.

F.E.S. is precipitated from the alkaline solution by acidification to reduce the pH of the solution and effect precipitation of the F.E.S. Generally, the pH is reduced to about 2 to 6, preferably 4 to 6, with one of the mineral acids such as sulfuric, hydrochloric, etc., acids or acetic acid. Sulfuric acid is preferred. After acidification the solution is allowed to stand for a time sufficient to allow for complete precipitation, e.g. ½ to 3 or more hours, and the precipitated F.E.S. is recovered by conventional means. The temperature of the alkaline solution during precipitation is preferably maintained at about 5 to 70° C., or even up to about 90° C., to increase the side of the F.E.S. crystals precipitated since the larger crystals are more easily filterable thus facilitating F.E.S. recovery. The solution can be heated either prior to, during or immediately after acidification. Temperatures in the range of about 60 to 65° C. are preferred. F.E.S. can, if desired, be precipitated at room temperature although finer particles are produced. When the solution is heated, F.E.S. recovery is in excess of 80% of the theory with a purity of about 95%.

The F.E.S. particles recovered are dried, e.g. in air or under mild heating, e.g. about 50° C., and can, if desired, be recrystallized. Recrystallization can be accomplished in an alcohol such as methanol, ethanol and isopropyl to improve the impurity thereof. Recovery is by the addition of water and other solvents can also be used. F.E.S. having a purity in excess of 99% is obtained upon recrystallization. If desired, F.E.S. can be decolorized with char.

The following example illustrates the production of F.E.S.

EXAMPLE I

Inoculum preparation

Spores from a well sporulated Bennett's agar slant culture of the organism *Gibberella zeae*, strain NRRL 3311 no more than two months old are suspended in 5 ml. of sterile water added to the slant tube and are transferred to a 500-ml. Erlenmeyer flask containing 100 ml. of sterile Bennett's medium. The inoculated flask is shaken on a rotary shaker at 30° C. for 24 hours. Ten ml. of the first stage inoculum is used to inoculate 300 ml. of sterile Bennett's medium in a 1 l. Erlenmeyer flask equipped with a side arm at the bottom of the flask to which is attached a length of rubber tubing having a short glass tube inserted at the terminus. The tube is covered with a milk filter disc and with paper to keep it sterile after sterilization. All flasks are closed with loose cotton plugs. The inoculated second stage is shaken on a reciprocal shaker at 30° C. for 24 hours.

Fermentation procedure

Fermentation is conducted in aluminum trays (5 x 20 x 40 inches) covered by aluminum lids (2 x 20.5 x 40.5 inches) resting on six laboratory tubing clamps spaced equally and attached to the upper edge of the tray. This supports the under-surface of the lid about 0.25 inch above the upper edge of the tray.

The trays are filled to a level depth of 3 inches with exfoliated vermiculite (insulation grade—coarsely screened, mixed #1, #2, #3 grades Zonolite described in Table I), the lids are put in place and the trays are autoclaved for about two hours at 15 p.s.i.g.

TABLE I.—SIEVE ANALYSIS STANDARD ZONOLITE GRADES

| Grade No. | U.S. standard sieve size | Cumulative percent retained | |
|---|---|---|---|
| | | Maximum | Minimum |
| 1 Density: 4 to 7 lbs. per cu. ft. Sieve analysis (by weight) | 3/8 | 10 | 0 |
| | 4 | 60 | 30 |
| | 8 | 95 | 65 |
| | 16 | 100 | 85 |
| 2 Density: 4 to 8 lbs. per cu. ft. Sieve analysis (by weight) | 4 | 5 | 0 |
| | 8 | 80 | 20 |
| | 16 | 99 | 75 |
| | 30 | 100 | 90 |
| 3 Density: 5 to 9 lbs. per cu. ft. Sieve analysis (by weight). | 8 | 10 | 0 |
| | 16 | 60 | 20 |
| | 30 | 95 | 65 |
| | 50 | 98 | 75 |
| | 100 | 100 | 90 |

A production medium for the fermentation is prepared according to the formula below.

MEDIUM

|  | Percent | Grams |
| --- | --- | --- |
| Cerelose (37% glucose) | 40.7 | 22,996 |
| BYE 100—yeast | 0.1 | 56.5 |
| KCl | 0.05 | 28.25 |
| $MgSO_4$ | 0.05 | 28.25 |
| $NaNO_3$ | 0.2 | 28.25 |
| $NH_4NO_3$ | 1.0 | 113.0 |
| $K_2HPO_4$ | 0.1 | 565.0 |
| Distilled water to | | 56.51. |

Cerelose is a commercially available glucose monohydrate. All percentages are grams per 100 cc. to make up the final medium. Thirteen and one-half liter quantities are dispensed into 5-gallon stainless steel milk cans, the lids of which have been equipped with two stainless steel tubulatures, one of which just enters the lid and serves as an air inlet, and the other of which extends to the bottom of the can with a bend which places the bottom orifice near the outer edge of the can. Lids are seated firmly in place. One end of a short piece of rubber tubing is attached to the air tubulature, the other to a piece of glass tubing in which is lightly packed a wad of glass wool to serve as an air filter. A longer piece of tubing is attached to the remaining tubulature. The glass air-filter and the end of the longer rubber tubing are covered with a milk filter disc and a paper outer covering and the can and contents are autoclaved 20 min. at 15 p.s.i.g.

The sterile production medium is inoculated by introducing the contents of one second-stage inoculum flask through the longer rubber tubing. Inoculum is thoroughly dispersed in the medium and the contents of one can are dispensed evenly through the longer rubber tube over the surface of the vermiculite in one tray. Siphoning of can contents is started by forcing air into the air tubulature.

The loaded trays are immersed to a depth of about two inches in a pan circulating water at an entrance temperature of 15–17° C. The circulation rate is adjusted so that the heat generated by the fermentation process does not increase the exit water temperature by more than one degree centigrade.

Incubation is continued for from two to six weeks or until the concentration of F.E.S. reaches a maximum.

Sampling is done weekly by removing 15 adequately spaced plugs 2 cm. in diameter cut through the entire depth of the cake. The plugs are crumbled by rubbing through a screen, mixed thoroughly and a 100 g. sample is assayed.

In the assay, one hundred grams of cake is extracted two times with water by grinding for about 30 seconds in a Waring Blendor. Each extract is removed by vacuum filtration. Combined water extracts total about 600–700 ml. Water extracted samples are air dried under heat lamps and are extracted three times with methanol in the same fashion. Combined methanol extracts total about 700–800 ml.

Methanol extracts are diluted with spectroscopic grade methanol to contain 5–10 μg. F.E.S. per ml. and the absorbance of the dilute solution is compared at 236 mμ with a standard solution of pure F.E.S. in spectroscopic methanol prepared to contain 10 μg. F.E.S. per ml. Absorbance at 236 mμ is directly proportional to concentration.

The following example serves to illustrate the recovery process of this invention.

EXAMPLE II

Five hundred gram lots from 16 different fermentations of a fermentation cake resulting from the production of F.E.S. according to Example I, were each suspended in 2.0 liters of 0.25% sodium hydroxide solution (pH 11–12). The suspensions were each stirred for two hours, and filtered. The resulting cakes were rinsed with 1.5 liters of warm water in three 500 ml. portions, and the combined wash and extract from each lot clarified by filtration. The polished filtrates were stirred, warmed to 50–55° C., and the F.E.S. precipitated from each by acidification to pH 6 with 50% $H_2SO_4$. After holding one hour at 50–55° C., with stirring, the precipitated crystals from each lot were collected on filters, rinsed with water, and dried. Results are summarized in Table II.

TABLE II

| Lot | Fermentation cake | | Crude crystals | | | Spent ferm. cake | | | Mother liquor | | |
| --- | --- | --- | --- | --- | --- | --- | --- | --- | --- | --- | --- |
| | Assay [1] | FES (g.) | Wt. (g.) | Purity | FES, percent | Wt. (g.) | Assay [1] | FES, percent | Vol. [2] | Assay | FES, percent |
| 1 | 1.16 | 5.80 | 5.6 | 95.4 | 92.0 | 580 | .136 | 13.6 | 3.36 | .046 | 2.7 |
| 2 | 1.16 | 5.80 | 5.5 | 94.5 | 89.6 | 432 | .202 | 15.0 | 3.36 | .058 | 3.4 |
| 3 | 1.08 | 5.40 | 3.6 | 96.1 | 64.0 | 389 | 1.60 | 11.5 | 3.64 | .017 | 1.1 |
| 4 | 1.25 | 6.25 | 5.6 | 95.2 | 85.3 | 420 | .214 | 16.8 | 3.52 | .065 | 3.7 |
| 5 | 1.25 | 6.25 | 5.7 | 95.0 | 86.7 | 485 | .144 | 11.1 | 3.57 | .067 | 3.8 |
| 6 | 1.36 | 6.80 | 6.0 | 95.5 | 84.6 | 470 | .142 | 9.8 | 3.74 | .066 | 3.6 |
| 7 | 1.28 | 6.40 | 5.6 | 94.7 | 82.9 | 595 | .218 | 20.3 | 3.58 | .069 | 3.9 |
| 8 | 1.30 | 6.50 | 5.7 | 93.6 | 82.2 | 390 | .059 | 3.5 | 3.61 | .106 | 5.9 |
| 9 | 1.26 | 6.30 | 4.8 | 95.1 | 72.4 | 464 | .189 | 13.9 | 3.41 | .057 | 3.1 |
| 10 | 1.26 | 6.30 | 4.7 | 94.3 | 70.3 | 472 | .156 | 13.2 | 3.62 | .090 | 5.2 |
| 11 | 1.37 | 6.85 | 5.9 | 95.1 | 81.9 | 425 | .127 | 9.2 | 3.37 | .076 | 3.7 |
| 12 | 1.23 | 6.15 | 5.0 | 93.3 | 75.9 | 390 | .167 | 10.6 | 3.52 | .089 | 5.1 |
| 13 | 1.12 | 5.60 | 4.8 | 96.1 | 82.4 | 632 | .127 | 14.3 | 3.50 | .069 | 4.3 |
| 14 | 1.12 | 5.6 | 4.8 | 95.8 | 82.1 | 552 | .225 | 22.2 | 3.50 | .075 | 4.7 |
| 15 | 1.12 | 5.6 | 4.9 | 94.9 | 83.0 | 533 | .119 | 11.3 | 3.18 | .084 | 5.2 |
| 16 | 1.11 | 5.55 | 4.0 | 96.1 | 69.3 | 425 | .216 | 16.5 | 3.81 | .078 | 5.5 |

[1] Assay in gms. per 100 gms.
[2] Volume in liters and assay in gms. per liter.

EXAMPLE III

Recovery of F.E.S. is accomplished according to the process of Example II, replacing the sodium hydroxide with ammonium hydroxide. Recovery is also accomplished according to the process of Example II, replacing the sulfuric acid with acetic acid.

The recrystallization of F.E.S. is illustrated by the following example.

EXAMPLE IV

Fifty grams of a composite of F.E.S. recovered by the procedure of Example II, purity 95%, was dissolved in 500 milliliters of isopropyl alcohol and treated with 10 gm. char. The F.E.S. had a Gardner color of 7.0. The solution was concentrated to 125 ml., polished and F.E.S. precipitated by the addition of 125 ml. of water. F.E.S. was recovered in an amount of 41.5 gm. (86.9% yield) with a good color and a purity of 99.4%.

It is claimed:
1. A process for the recovery of the compound

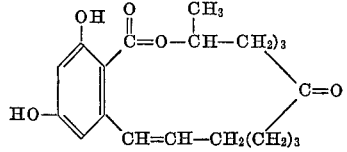

from a fermentation cake containing the same which comprises slurrying the fermentation cake with an alkaline aqueous solution, the slurry so produced having a pH sufficient to render the compound water soluble but insufficient to decompose the compound, filtering the resulting solution, acidifying the remaining solution to reduce the pH thereof and effect precipitation of the compound, and recovering the precipitated compound.

2. The process if claim 1 wherein the fermentation cake is washed with water prior to treatment with the alkaline solution.

3. The process of claim 1 wherein the slurry has a pH above 9.

4. The process of claim 3 wherein the alkaline solution is an aqueous solution of a material relected from the group consisting of the alkali metal, alkaline earth metal and ammonium hydroxides nd carbonates.

5. The process of claim 1 wherein the pH of the slurry is between about 10 and 12.

6. The process of claim 5 wherein the alkaline solution is an aqueous solution of a material selected from the group consisting of sodium hydroxide, potassium hydroxide and ammonium hydroxide.

7. The process of claim 1 wherein the pH of the solution after acidification is less than 6.

8. The process of claim 6 wherein the acidification is by addition of sulfuric acid and the pH of the solution after acidification is between about 4 and 6.

9. The process of claim 7 wherein the acidification is by addition of an acidic material selected from the group consisting of mineral acids and acetic acid.

10. The process of claim 1 wherein the solution is heated to a temperature of between about 50 and 90° C. during precipitation of the compound.

11. The process of claim 4 wherein the acidification is by addition of a mineral acid and the pH of the solution after acidification is between about 2 and 6.

12. The process of claim 11 wherein the temperature of the solution during precipitation is maintained at from about 50 to 90° C.

13. The process of claim 12 wherein the temperature is between about 50 to 70° C.

14. The process of claim 8 wherein the temperature of the solution during precipitation is maintained at from about 50 to 70° C.

15. The process of claim 1 wherein the fermentation cake is the cake resulting from cultivation of a microorganism in a synthetic fermentation medium consisting essentially of an exfoliated vermiculite support for the michoorganism and an aqueous nutrient medium for the microorganism.

16. The process of claim 1 wherein the fermentation cake is the cake resulting from cultivation of the microorganism *Gibberella zeae* in a synthetic fermentation medium consisting of an exfoliated vermiculite support and an aqueous nutrient medium for the microorganism.

17. A process for the recovery of the compound 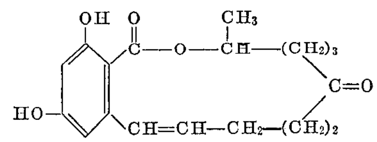 from a fermentation cake resulting from the cultivation of a microorganism in a synthetic fermentation medium consisting essentially of an exfoliated wermiculite support and an aqueous nutrient medium containing a sugar as the assimilable carbohydrate source for the microorganism consisting of slurrying the fermentation cake with an alkaline aqueous solution to provide a slurry having a pH of between about 10 and 12, the alkaline solution being an aqueous solution of a basic material selected from the group consisting of the alkali metal, alkaline earth metal and ammonium hydroxides and carbonates, filtering and resulting solution, acidifying the remaining solution with an acidic material selected from the group consisting of mineral acids and acetic acid until the pH of the solution is below 6 and the compound precipitates, and recovering the precipitated compound.

18. The process of claim 17 wherein the fermentation cake is washed with water prior to treatment with the alkaline solution.

19. The process of claim 18 wherein the microorganism is *Gibberella zeae.*

References Cited

UNITED STATES PATENTS

| | | | |
|---|---|---|---|
| 3,028,312 | 4/1962 | LeMense | 195—95 |
| 3,196,019 | 7/1965 | Andrews et al. | 195—36X |
| 3,239,342 | 3/1966 | Hodge et al. | 260—343.2 |

A. LOUIS MONACELL, Primary Examiner

S. RAND, Assistant Examiner

U.S. Cl. X.R.

195—36

UNITED STATES PATENT OFFICE
CERTIFICATE OF CORRECTION

Patent No. 3,580,929    Dated May 25, 1971

Inventor(s) Phil H. Hidy, Vernon V. Young

It is certified that error appears in the above-identified patent and that said Letters Patent are hereby corrected as shown below:

Column 1, line 16, "at" should read --as--; that portion of the structural formula at lines 40-50 reading

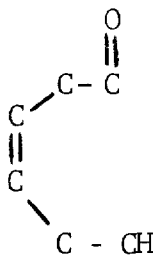    should read    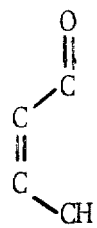

Column 3, line 63, "highfiher" should read --higher--.
Column 4, line 7, "5" should read --50--; line 8, "side" should read --size--.
Column 5, lines 3-12, the second entry in the table ("BYE") should read --BYF--; after the seventh entry ("$K_2HPO_4$") insert --(added last)--.
Column 6, that portion of the structural formula at lines 69-75 reading

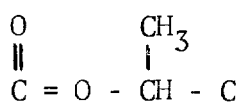    should read    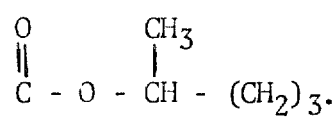

Column 7, line 15, "relected" should read --selected--; line 17, "nd" should read --and--.

Signed and sealed this 14th day of September 1971.

(SEAL)
Attest:

EDWARD M. FLETCHER, JR.    ROBERT GOTTSCHLAK
Attesting Officer    Acting Commissioner of Patents